US012675966B2

(12) United States Patent
Rollins et al.

(10) Patent No.: US 12,675,966 B2
(45) Date of Patent: Jul. 7, 2026

(54) SYSTEMS, METHODS, AND COMPUTER PROGRAM PRODUCTS FOR IMAGE ANALYSIS

(71) Applicant: DEVON ENERGY CORPORATION, Oklahoma City, OK (US)

(72) Inventors: Beau Travis Rollins, Oklahoma City, OK (US); Amos James Hall, Sparks, OK (US); Jared Lee Markes, Edmond, OK (US); Steven Boyd Jackson, II, Dallas, TX (US)

(73) Assignee: DEVON ENERGY CORPORATION, Oklahoma City, OK (US)

( * ) Notice: Subject to any disclaimer, the term of this patent is extended or adjusted under 35 U.S.C. 154(b) by 774 days.

(21) Appl. No.: 17/872,409

(22) Filed: Jul. 25, 2022

(65) Prior Publication Data

US 2023/0051823 A1 Feb. 16, 2023

Related U.S. Application Data

(60) Provisional application No. 63/228,691, filed on Aug. 3, 2021.

(51) Int. Cl.
*G06V 10/25* (2022.01)
*G06V 10/75* (2022.01)
*G06V 10/771* (2022.01)

(52) U.S. Cl.
CPC ............ *G06V 10/25* (2022.01); *G06V 10/751* (2022.01); *G06V 10/771* (2022.01)

(58) Field of Classification Search
None
See application file for complete search history.

(56) References Cited

U.S. PATENT DOCUMENTS

| | | | |
|---|---|---|---|
| 6,937,743 B2 | 8/2005 | Rizzotti et al. | |
| 7,542,585 B2 | 6/2009 | Chen | |
| 7,609,852 B2 | 10/2009 | Chen | |
| 7,859,419 B2 | 12/2010 | Shen-Kuen et al. | |
| 7,991,187 B2 | 8/2011 | Hou | |
| 9,224,278 B2 | 12/2015 | Bernal et al. | |
| 9,417,310 B2 | 8/2016 | Meloche et al. | |
| 9,520,040 B2 | 12/2016 | Mavromatis | |
| 9,530,074 B2 | 12/2016 | Newton et al. | |
| 9,958,328 B2 | 5/2018 | Cabib et al. | |

(Continued)

OTHER PUBLICATIONS

Ahmad et al., "A Machine Learning Approach to Horizon Line Detection Using Local Features," Advances in Visual Computing (ISVC 2013), Lecture Notes in Computer Science, vol. 8033, pp. 181-193 (Year: 2013).*

Breuers et al., "Exploring Bounding Box Context for Multi-Object Tracker Fusion," 2016 IEEE Winter Conference on Applications of Computer Vision (WACV), pp. 1-8 (Year: 2016).*

(Continued)

*Primary Examiner* — Vincent Rudolph
(74) *Attorney, Agent, or Firm* — McAfee & Taft

(57) ABSTRACT

Image analytics systems, methods, and computer program products to autonomously analyze an image to identify and detect features in the image, such as the horizon, and/or identify and detect objects of interest therein, such as, smoke or possible smoke. The image is captured, for example, by RGB cameras, and depicts a scene to be analyzed. The intelligent image analytic system is configured to provide alerts and/or other information to one or more concerned parties and/or computing systems to take an appropriate response.

27 Claims, 10 Drawing Sheets

(56) References Cited

U.S. PATENT DOCUMENTS

| | | | |
|---|---|---|---|
| 10,055,648 B1 | 8/2018 | Grigsby et al. | |
| 10,102,429 B2 | 10/2018 | Schnittman | |
| 10,304,306 B2 | 5/2019 | Mills et al. | |
| 10,846,867 B2 | 11/2020 | Bai | |
| 10,854,062 B2 | 12/2020 | Ebata | |
| 10,920,982 B2 * | 2/2021 | Arabi | F23N 5/082 |
| 12,260,645 B2 | 3/2025 | Hall et al. | |
| 2013/0275100 A1 | 10/2013 | Ellis et al. | |
| 2014/0093131 A1 | 4/2014 | Fan et al. | |
| 2018/0114158 A1 | 4/2018 | Foubert et al. | |
| 2019/0258878 A1 | 8/2019 | Koivisto et al. | |
| 2019/0272425 A1 | 9/2019 | Tang et al. | |
| 2020/0164814 A1 | 5/2020 | Solar et al. | |
| 2020/0387120 A1 | 12/2020 | Gurajapu et al. | |
| 2022/0198788 A1 * | 6/2022 | Patel | G06V 10/26 |

OTHER PUBLICATIONS

Prasad et al., "MSCM-LiFe: Multi-scale cross modal linear feature for horizon detection in maritime images," 2016 IEEE Region 10 Conference (TENCON), pp. 1366-1370 (Year: 2016).*

Mazzia et al., "Improvement in Land Cover and Crop Classification based on Temporal Features Learning from Sentinel-2 Data Using Recurrent-Convolutional Neural Network (R-CNN)," Applied Sciences, vol. 10, Issue 1 (Year: 2020).*

Liang et al., "Horizon Detection from Electro-optical Sensors under Maritime Environment," IEEE Transactions on Instrumentation and Measurement, vol. 69, No. 1, pp. 45-53 (Year: 2020).*

"Tracking and Object Classification for Automated Surveillance", A. Heyden et al. (Eds.): ECCV 2002, LNCS 2353, 343-357, 2002. 2002.

"Andium Flare Monitoring", andium.com [online]. Sep. 19, 2020. Retrieved on Jul. 22, 2022. [https://andium.com/downloads/documents/Brochures/FM/Andium%20Flare%20Monitoring.pdf].

* cited by examiner

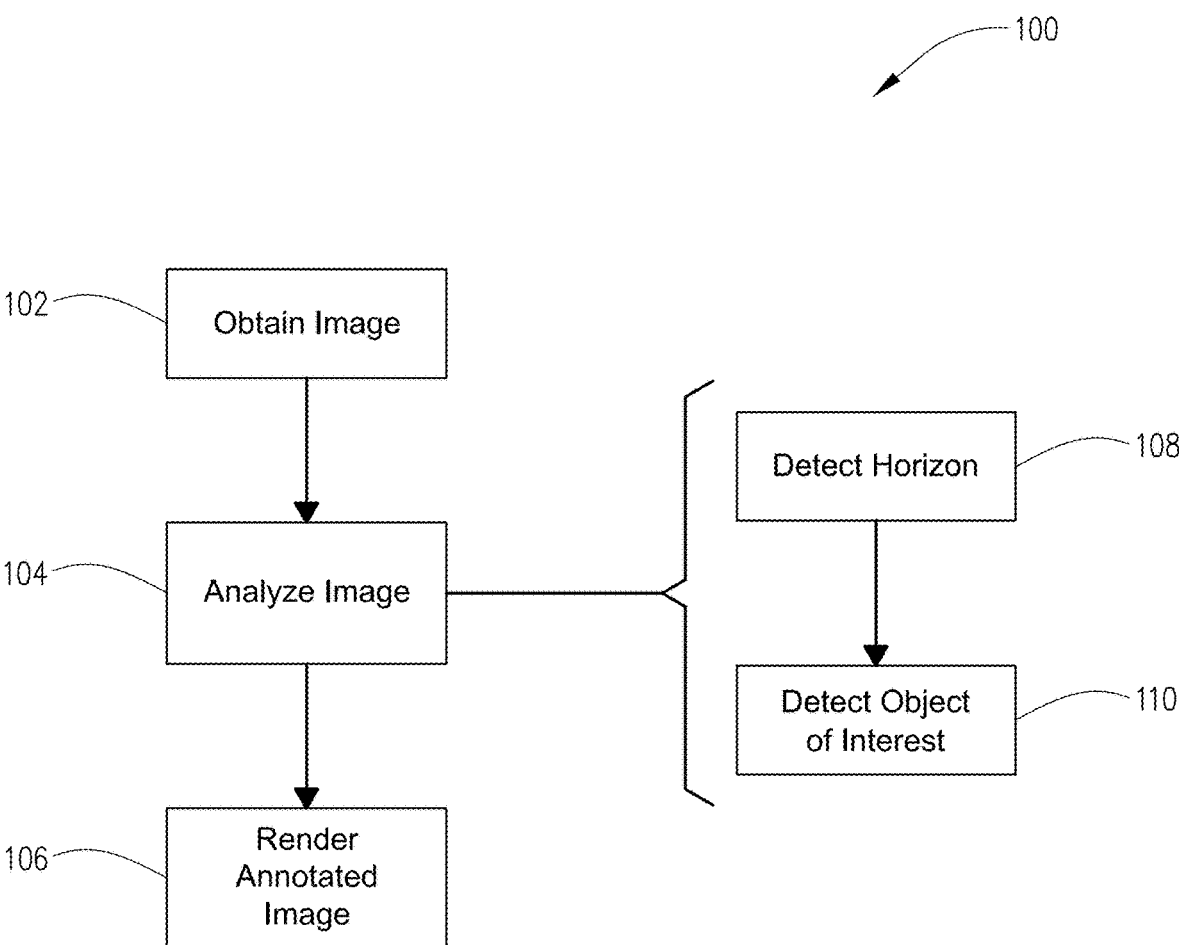
102 — Obtain Image
104 — Analyze Image
106 — Render Annotated Image
108 — Detect Horizon
110 — Detect Object of Interest
100
FIG. 1

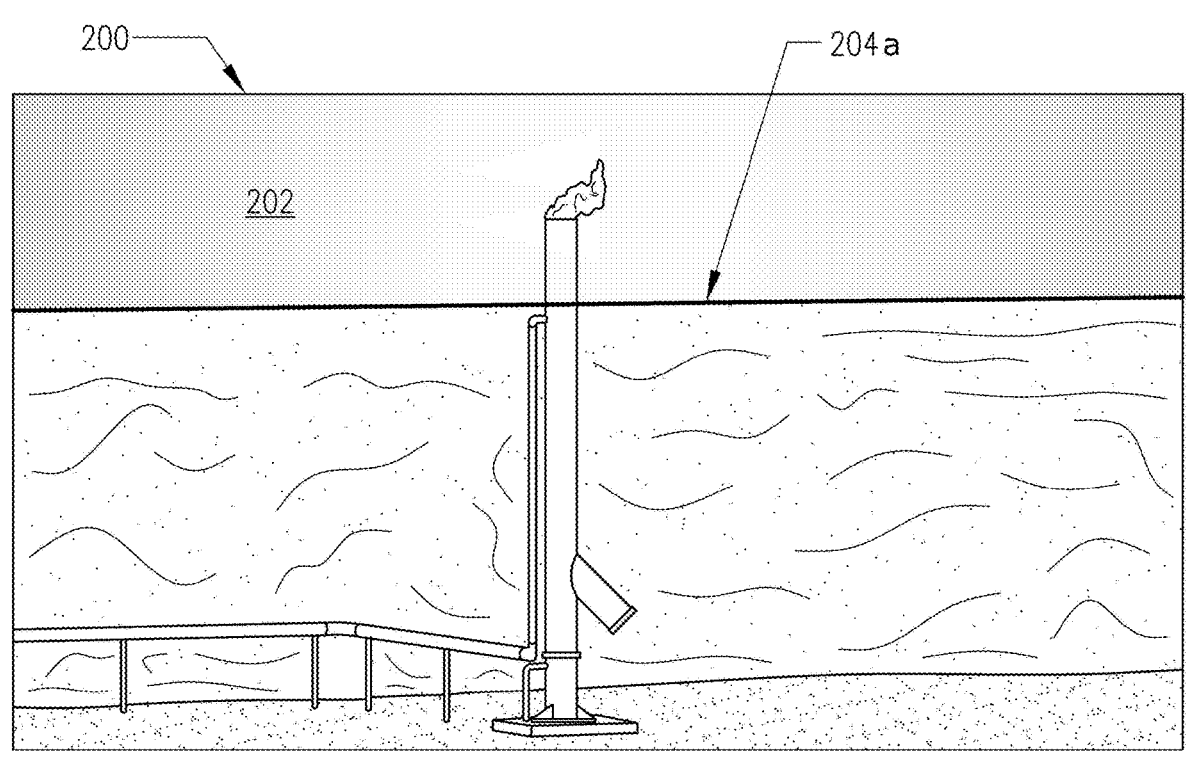
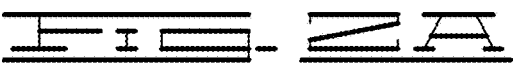
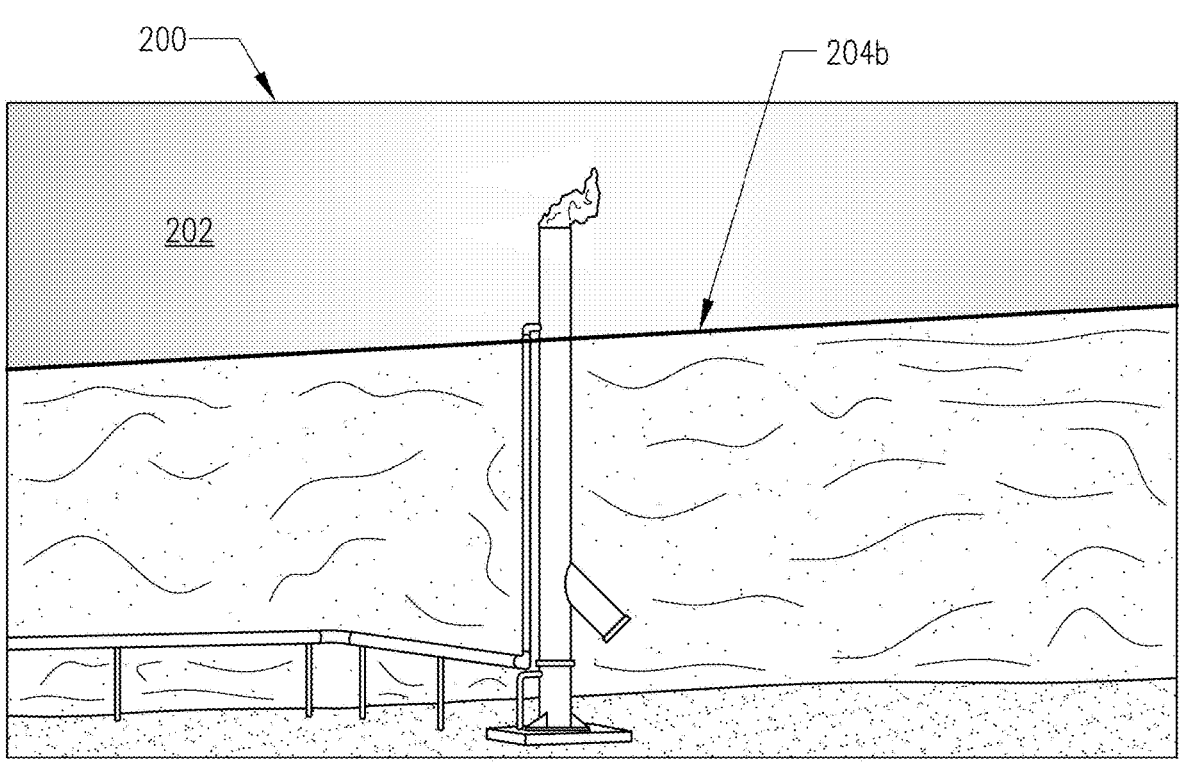
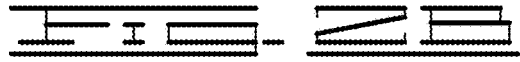

200

204b

208

210

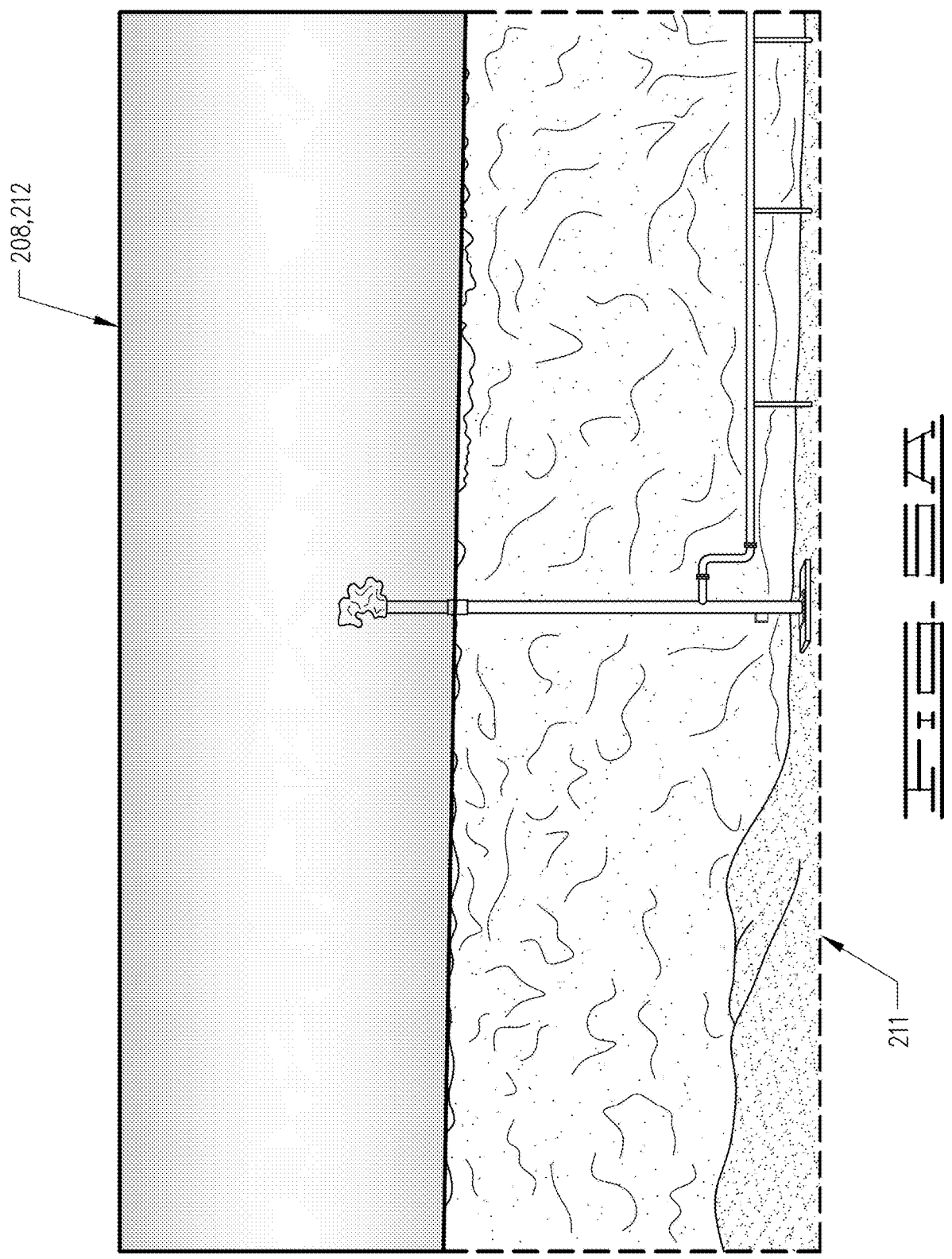

SYSTEMS, METHODS, AND COMPUTER PROGRAM PRODUCTS FOR IMAGE ANALYSIS

CROSS-REFERENCE TO RELATED APPLICATION

This application claims the benefit of prior-filed U.S. provisional application No. 63/228,691, filed on Aug. 3, 2021, which is incorporated herein by reference in its entirety.

TECHNICAL FIELD

The present disclosure relates generally to systems, methods, and computer program products for image analytics, and more particularly, and without limitation, to utilizing one or more techniques to locate, identify, and/or detect at least one feature and/or at least one object of interest (OOI) in an image.

BACKGROUND

For ease of discussion and illustration purposes only, and not by way of limitation, the systems, methods, techniques, and computer program products of the present disclosure are made in reference to analyzing an image depicting a scene at a wellsite, to identify at least one object, feature, and/or other information within the image, e.g. to identify and detect smoke in an image.

The image analytics systems, methods, techniques, and computer program products of the present disclosure are not limited to such environment and are also applicable and suitable to any other environment or end-use where there is a need to analyze an image in connection with locating, detecting, and/or identifying at least one object, feature, and/or other information within the image.

For example, in the context of a wellsite setting, it can be cost prohibitive to monitor smoke on flaring equipment. For example, there exists thermal cameras and other specialized equipment to detect smoke on flaring equipment, but the cost of utilizing such technologies can be prohibitive for most oil and gas operators due to the large number of thermal cameras and other specialized equipment needed to cover the full scope of existing field operations. Currently, for most operators, smoke detection may be performed visually when field personnel are on site.

SUMMARY

A method of analyzing an image to detect at least one object of interest (OOI) therein, wherein the image depicts a scene is disclosed. The method comprising detecting a horizon in the image, wherein the detected horizon defines a boundary of a candidate area; and detecting the at least one OOI in the candidate area by a plurality of image processing techniques. Wherein each of the plurality of image processing techniques is configured to yield resultant candidate OOI, such that an area of overlap of resultant candidate OOI from the plurality of image processing techniques corresponds to detection of the at least one OOI in the area of overlap.

A computing system configured to analyze an image to detect at least one object of interest (OOI) therein, wherein the image depicts a scene. The computing system comprising: at least one processor; at least one non-transitory computer readable storage media operably coupled to the at least one processor; and program instructions stored on the at least one non-transitory computer readable storage media for execution by the at least one processor that, when executed by the at least one processor, cause the at least one processor to perform operations. The operations comprising: detecting a horizon in the image, wherein the detected horizon defines a boundary of a candidate area; and detecting the at least one OOI in the candidate area by a plurality of image processing techniques, wherein each of the plurality of image processing techniques is configured to yield resultant candidate OOI, such that an area of overlap of resultant candidate OOI from the plurality of image processing techniques corresponds to detection of the at least one OOI in the area of overlap.

A computer program product including one or more non-transitory computer readable storage mediums having instructions encoded thereon that when executed by at least one processor, cause a process to be carried out for analyzing an image to detect at least one object of interest (OOI) therein, wherein the image depicts a scene. The process comprising: detecting a horizon in the image, wherein the detected horizon defines a boundary of a candidate area; and detecting the at least one OOI in the candidate area by a plurality of image processing techniques, wherein each of the plurality of image processing techniques is configured to yield resultant candidate OOI, such that an area of overlap of resultant candidate OOI from the plurality of image processing techniques corresponds to detection of the at least one OOI in the area of overlap.

BRIEF DESCRIPTION OF THE DRAWINGS

The figures included with this application illustrate certain aspects of the systems, methods, techniques, and computer program products described herein. However, the figures should not be viewed as exclusive representations or limiting. The subject matter disclosed is capable of modification or alteration in form and function, as will occur to those skilled in the art with the benefit of this disclosure.

FIG. 1 is an exemplary process of analyzing an image.

FIGS. 2A-2B illustrate an example of various techniques of analyzing an image to detect a horizon therein in accordance with the present disclosure.

FIG. 5A illustrates an example various of techniques of analyzing an image to detect at least one object of interest therein in accordance with the present disclosure.

DETAILED DESCRIPTION

Figure 3A:
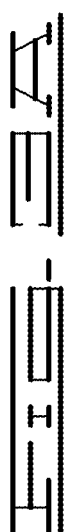
FIGS. 3A-3C illustrate another example of various techniques of analyzing an image to detect a horizon therein in accordance with the present disclosure.

Some examples of the present disclosure can overcome one or more of the abovementioned problems by applying computer vision and other image-processing techniques to identify at least one object of interest (OOI) from a digital image. For example, a system can receive a digital image, the digital image may be a still image from a camera or a frame from a video image. The image may depict a scene therein. The system can then analyze the image to identify at least one OOI therein. The processing results may be returned in a textual format, a verbal format (e.g., with speech output), in image format, or any combination thereof For example, the system may generate and render an annotated image with a detected OOI identified, labelled, and/or feature(s), and/or other information associated with the image updated and/or annotated on the image depicting the scene and/or included in any image data associated with the image.

For example, in the context of a wellsite setting, it is not commercially feasible or practical to have an individual on site at all times nor to have an individual remotely monitor all sites and equipment at all times. Additionally, the use and maintenance of specialized monitoring equipment can be cost prohibitive. The described systems, methods, and computer program products of the present disclosure aid an organization by automating a portion of the monitoring of sites and is configurable and capable of generating alerts. For example, if the systems, methods, and computer program products of the present disclosure are configured to autonomously detect when oil and gas flaring equipment is smoking and thus, for example, needs maintenance, the systems, methods, and computer program products can be configured to generate alarms or alerts. The inventive concepts described herein are capable of being attained using relatively low-cost image capturing devices and other equipment, for example, equipment that is already in use at the location to be monitored. The described systems, methods, and computer program products of the present disclosure can help an organization improve its environmental stewardship, achieve enhanced safety, security, and environmental compliance to daily operations.

For readability purposes only, and not by way of limitation, the exemplary computing systems, methods, and computer program products are configured utilizing the Python programming language, for example, Python 3.7.5 and related or compatible libraries, such as, for example, OpenCV, Pandas, Matplotlib, NumPy, Scikit-Learn, and Pickle5. The present disclosure is not limited to the Python programming language nor the exemplary libraries; rather other programming languages and libraries are also suitable to achieve the described functions, techniques, and results.

For simplicity, the values of certain thresholds, sizes, percentages, kernel sizes presented in the following description are provided as illustrative and are not to be construed as limiting. Other values suitable for the end-use application, environment of use, are configurable for such application or operator preference or operator defined criteria.

FIG. 1 depicts an exemplary process 100 for analyzing an image of the intelligent image analytics systems described herein. The following provides additional details relating to the intelligent image analysis systems, methods, and computer program products to detect at least one OOI in an image.

With reference to FIG. 1, an image is obtained, as referenced by numeral 102, by an image capturing device, e.g., a camera, operably coupled to the system or from another source, such as an image repository accessible over a network, including the Internet. The camera may be any suitable color camera, including a digital camera, video camera (with the ability to capture or extract a still frame or freeze frame), a stationary camera or a camera having pan, tilt, zoom (PTZ) capabilities, or a camera having one or more of the aforementioned features and capabilities.

The image is then analyzed as illustrated at block 104. The analysis of the image includes step 108 to detect a horizon in the image. The detected horizon defines a boundary of a candidate area. Upon detection of a horizon, the analysis further includes step 110 to detect, in the candidate area, at least one OOI in the image. The analysis of the candidate area to detect at least one OOI is achieved by a plurality of image processing techniques, wherein each of the plurality of image processing techniques is configured to yield resultant candidate OOI. As will be described further, an area of overlap of resultant candidate OOI from the plurality of image processing techniques corresponds to detection of the at least one OOI, where the at least one OOI is in the area of overlap.

Depending on the format of the image captured, obtained, or ingested, the initial image may be preprocessed to convert color-space of the image, for example, from blue, green, red (BGR) to red, green, blue (RGB) format. A copy of the RGB format image is obtained and further converted to grayscale.

The image is analyzed to detect a horizon in the image. For example, the horizon is detected via at least two image processing techniques to yield a detected candidate horizon. The detected candidate horizons are compared, and a chosen horizon is selected from one of the detected candidate horizons. The chosen horizon corresponds to a best representation of the horizon in the image and the selection is based, in part, on a plurality of comparisons of each of the detected candidate horizons. FIGS. 2A-4C are examples of the various techniques of analyzing an image to detect a horizon and illustrate the detected candidate horizons 204a, 204b, and the chosen horizon 206.

Not depicted, if the intelligent image analytic system cannot detect a horizon at step 108, then the system is configured to declare that no horizon can be detected and will update the applicable image data and stop the image analysis. As will be illustrated below, by detecting the horizon using two image processing techniques provides redundancies to account for variable conditions associated with time of day, weather, and debris on the camera, etc. Stopping the analysis when no horizon is detected also helps minimize the false positive rate when the camera fails to look in the correct location.

The following describes the at least two image processing techniques to yield a detected candidate horizon 204. The at least two image processing techniques may be performed simultaneously or sequentially.

The first image processing technique configured to yield a detected candidate horizon may also be referred to herein as the "Sobel Horizon" technique and is applied to a grayscale format of image 200. The following steps of the first image processing technique to yield a detected candidate horizon occur sequentially. The first image processing technique includes cropping the grayscale format of the obtained image to at least a portion representative of the most common or likely position of the OOI to be detected in the image. For example, in the case of a wellsite and where an OOI may be located above certain equipment, the image may be cropped to, for example, an upper portion. If, for example, the OOI is commonly located elsewhere in an image, the image may be cropped to a percentage of the image size such that focus and analysis can be carried out on that particular portion of the image, e.g. a lower portion, side portion, or interior portion, etc. For example, the upper portion may be cropped to at least 50%, depending on the end-use application. For example, in some aspects, the upper portion may be cropped to at least 60%. The first technique further includes blurring the cropped grayscale format image by a Gaussian blur technique. The kernel size used for the Gaussian blur convolution technique may be any suitable size depending on the end-use application, including, without limitation a kernel size of 15×15. The first technique further includes then executing an edge-detection algorithm via a Sobel operation, for example in the vertical direction. The kernel size used for the edge-detection algorithm may be any suitable size depending on the end-use application, including without limitation a kernel size of 5×5. The pixel values of the executed Sobel operation edge-detection algorithm are inverted. Then a maximum pixel value of the inverted pixel values is captured. The inverted cropped image is then thresholded by at least, for example 15% to about 25% of the maximum pixel value. For example, in one aspect the threshold value amount is at least 20% of the maximum pixel value. Then a value of the percentage of white pixels are captured. The first image processing technique configured to yield a detected candidate horizon further includes creating contours around the white pixels and then calculating a width of each created contour. Then the technique continues to locating one or more widest contours that meet predefined criteria to isolate. For example, the predefined criteria include, without limitation a single contour, or a combination of the widest two contours whose combined width is greater than 30% to 60% of the image width. For example, the widest single contour or the widest two contours whose combined width is at least 40% of the image width is also suitable, depending on the end-use application. The located one or more widest contours that meet the predefined criteria are then isolated and converted to points. The first image processing technique configured to yield a detected candidate horizon then renders a fitted line through the points on the RGB format of the image, where the fitted line is representative of the resultant detected horizon of the first image processing technique. For example, a resultant detected horizon of the first image processing technique 204*a* is illustrated in image 200 of scene 202 depicted in FIGS. 2A, 3A, and 4A.

The second image processing technique for determining a candidate horizon 204 may also be referred to as the "Open Negative Sobel Horizon" and is applied to an RGB format of image 200. The following steps of the second image processing technique occur sequentially. The copy of the RGB format of image 200 is cropped to a portion representative of the most common or likely position of the OOI to be detected in the image. For example, in the case of a wellsite and where an OOI may be located above certain equipment, the image may be cropped to, for example, an upper portion. If, for example, the OOI is commonly located elsewhere in an image, the image may be cropped to a percentage of the image size such that focus and analysis can be carried out on that particular portion of the image, e.g. a lower portion, side portion, or interior portion, etc. For example, the upper portion may be cropped to at least 50%, depending on the end-use application. For example, in some aspects, the upper portion may be cropped to at least 60%.

The second image processing technique further includes blurring the cropped RGB format image by a Gaussian blur technique. The kernel size used for the Gaussian blur convolution technique may be any suitable size depending on the end-use application, including, without limitation a kernel size of 5×5. The second technique then first includes executing a Canny edge-detection algorithm on the blurred cropped RGB format image. The pixel values of the executed Canny edge-detection algorithm are inverted. The second image processing technique further includes reducing image noise, for example by using an open morphological transformation on the inverted pixel value image, and then masking a head-up display (HUD) from the noise reduced image. The second image processing technique then includes blurring the masked HUD image by a Gaussian blur technique. The kernel size used for the Gaussian blur convolution technique may be any suitable size depending on the end-use application, including, without limitation a kernel size of 15×15. An edge-detection algorithm via a Sobel operation on the blurred masked HUD image is executed, for example, in the vertical direction. The kernel size used for the edge-detection algorithm may be any suitable size depending on the end-use application, including without limitation a kernel size of 5×5. The pixel values of the executed Sobel operation edge-detection algorithm are inverted. Then a maximum pixel value of the inverted pixel values is captured. The inverted cropped image is then thresholded by at least, for example 15% to about 25% of the maximum pixel value. For example, in one aspect the threshold value amount is at least 20% of the maximum pixel value. Then a value of the percentage of white pixels are captured. The second image processing technique configured to yield a detected candidate horizon further includes creating contours around the white pixels and then calculating a width of each created contour. Then the second image processing technique continues to locating one or more widest contours that meet predefined criteria to isolate. For example, the predefined criteria include, without limitation a single contour, or a combination of the widest two contours whose combined width is greater than 30% to 60% of the image width. For example, the widest single contour or the widest two contours whose combined width is at least 40% of the image width is also suitable, depending on the end-use application. The located one or more widest contours that meet the predefined criteria are then isolated and converted to points. The second image processing technique configured to yield a detected candidate horizon then renders a fitted line through the points on the RGB format of the image, where the fitted line is representative of the resultant detected horizon of the second image processing technique. For example, a resultant detected horizon of the second image processing technique 204*b* is illustrated in image 200 of scene 202 depicted in FIGS. 2B, 3B, and 4B.

For example, the at least two image processing techniques to yield a detected candidate horizon have compensatory strengths that can accommodate for a weakness or shortcoming of the other of the at least two image processing techniques during variable times of day, weather, and/or any foreground/background obstacles.

The detecting a horizon in the image further includes selecting a chosen horizon from one of the detected candidate horizons, wherein the chosen horizon corresponds to a best representation of the horizon in the image. The chosen horizon line is selected based, in part, on a plurality of comparisons of each of the detected candidate horizons.

For example, the plurality of comparisons for selecting a chosen horizon includes: assessing of a percentage values of white pixels and a number of contours in a Sobel threshold for each of the at least two image processing techniques; determining a validity of the detected candidate horizon for each of the at least two image processing techniques; comparing similarities of the detected candidate horizon for each of the at least two image processing techniques; and comparing grayscale pixel intensity standard deviations above and below each of the candidate horizons.

For example, and not by limitation, in certain settings, in performing a plurality of comparisons, when no horizon is present, the percentage of white pixels may be greater than 8% and the number of contours will be greater than 600 in the Sobel threshold for each of the at least two image processing techniques. Other values may be suitable (and are configurable) given the end-use application and/or operator preference. For example, the thresholds for the percentage of white pixels and number of contours may be between 6%-10% and 500-700, respectively. For example, the technique may be configured to first check if a chosen horizon is possible, such that if the percentage of white pixels is greater than 8% and a number of contours is greater than 600, then no horizon will be detected, and the image data is updated accordingly and chosen horizon is set to (0,0,0); otherwise the plurality of comparisons will continue.

Figure 3B:
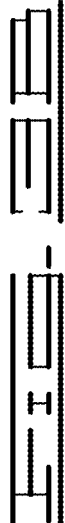
Figure 3C:

Another comparison of the plurality of comparisons includes determining a validity of the detected candidate horizon for each of the at least two image processing techniques. For example, the process of fitting a line through the widest contour's converted points, as described above in connection with each image processing technique is configured to return the parameters of the line in point slope form. This is algebraically reordered from the point slope form to slope intercept form. Then, the system is configured to plug in the left most x value and solve for y and plug in the right most x value and solve for y. If either the left most y or the right most y is negative or larger than the maximum y value of the image, then that solution is determined to be invalid. If neither of the candidate horizons 204a or 204b produced by the at least two image processing techniques, are valid, then the system is configured to set the chosen horizon to (0,0,0). If only one of the candidate horizons is valid, then the chosen horizon is the valid solution and the system is configured to populate the chosen horizon with the point slope form of the valid line. FIG. 3A is illustrative of a valid candidate horizon 204a, FIG. 3B is illustrative of an invalid candidate horizon 204b, and FIG. 3C is illustrative of the chosen horizon 206 in view of the prior description.

Figure 4A:
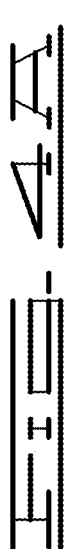
FIGS. 4A-4C illustrate yet another example of various techniques of analyzing an image to detect a horizon therein in accordance with the present disclosure.
Figure 4B:
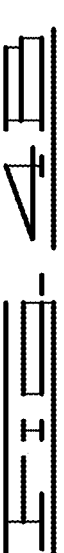

If both candidate horizons are valid, the plurality of comparisons further includes comparing similarities of the detected candidate horizon for each of the at least two image processing techniques. For example, FIGS. 4A and 4B are illustrative of detected candidate horizon 204a, 204b being deemed valid.

In one aspect, for example, a determination may be made to determine if the difference between the left most y-value of each line and the difference between the right most y-value of each line is, for example, 10 or less, the lines are defined as "similar" and the system may be configured to populate the chosen horizon with the point slope form of the detected candidate horizon of the first technique. If, for example, the difference between the left most y-value of each line or the difference between the right most y-value of each line is greater than 10, the lines are both valid yet dissimilar. In such a case, the system may be configured to then compare the grayscale value standard deviations above and below each candidate horizon from each of the at least two image processing techniques. Table 1 is illustrative of the grayscale value grayscale value standard deviations above and below each candidate horizon depicted in FIGS. 4A and 4B.

TABLE 1

| | First image processing technique depicted in FIG. 4A | Second image processing technique depicted in FIG. 4B |
|---|---|---|
| Grayscale standard deviation above candidate horizon | 30.53 | 14.62 |
| Grayscale standard deviation below candidate horizon | 21.47 | 22.73 |

As shown in Table 1, the absolute difference between the values of the grayscale standard deviation above the candidate horizon and below the candidate horizon for the first and second image processing techniques, is 15.91 and 1.26, respectively.

A technique for comparing the grayscale standard deviations above and below the candidate horizon will be discussed. For example, at least two contours are created, a first (or an upper) contour for the area above the candidate horizon, and a second (or a lower) contour for the area below the candidate horizon.

The upper contour may be created by capturing the (x,y) coordinates of the following points above the candidate horizon line: starting with the top left coordinate of the image, the left most point on the line, the right most point on the line, and finally the top right coordinate of the image. Then a mask of the upper contour is created which is then the mask is applied to the grayscale format of the image. Thereafter, black pixels, which may be defined as any pixel with a grayscale value of 0, for example, are filtered out. A standard deviation of grayscale values of the remaining pixels is calculated. Then, each of the standard deviations between the two masked upper contours from each of the at least two image processing techniques is compared, and the one with the lowest standard deviation is selected and captured.

Figure 4C:
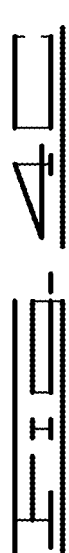

The lower contour may be created of the area below each candidate horizon line by capturing the (x,y) coordinates of the following points: starting with the left most point on the line, the bottom left coordinate of the image, the bottom right coordinate of the image, and finally the right most point on the line. A mask of the lower contour is created and applied to the grayscale format of the image. Thereafter, black pixels, which may be defined as any pixel with a grayscale value of 0, for example, are filtered out. A standard deviation of grayscale values of the remaining pixels is calculated. Then each of the standard deviations between the two masked lower contours from each of the at least two image processing techniques is compared, and the one with the lowest standard deviation is selected and captured. Then the absolute value of the difference in grayscale standard deviation above and below the candidate horizon lines between each of the at least two image processing techniques is calculated. A choice is made between the upper or lower contour results based on the position of the maximum value in the results of the absolute value difference in standard deviation. The image data is updated with the point slope form of the candidate line which results in the minimum grayscale standard deviation and such becomes the chosen horizon 206, as illustrated in FIG. 4C.

In some aspects, the detected horizon defines a boundary of a candidate area. For example, the detected horizon may be a lower boundary of a candidate area.

For example, FIG. 5A illustrates an example intermediary annotated image where area 208 above the chosen horizon is representative of a candidate area 212, and may be identified by a visual indicator to convey different information. As shown in FIG. 5A, area 210, below the chosen horizon, is bounded by a visual indicator 211 with indicia different than that of area 208. For example, visual indicators may be depicted in different colors, shapes, patterns, and labels, or any combination of the foregoing to allow a viewer of the processed image to visually distinguish between one or more features, elements, and OOI of and in the image. For example, if the candidate area is the "sky" for a depicted scene, then such bounding box visual indicator may be the color blue, and an "earth" bounding box visual indicator may be the color green.

Further information may be captured, including obtaining RGB histogram results of either or both areas 208 and 210, depending upon the end-use application. For example, the present description will continue to be in reference to use of the intelligent image analysis system of a wellsite where smoke is the OOI to be detected.

The system may be also be configured to perform a process which serves as a check in the event of an erroneous horizon detection, as well as preprocessing of the candidate area for purposes of detecting at least one OOI therein. For example, the captured RGB histogram values for the candidate area are captured. For example, the candidate area may be defined by capturing the (x,y) coordinates of the following points above the chosen horizon: the top left coordinate of the image, the left most point on the line representing the chosen horizon, the right most point on the line representing the chosen horizon, and the top right coordinate of the image. A mask of the candidate area is created and is applied to the RGB format of the image. The RGB pixels in the candidate area are converted to a list and any black pixels, which may be defined as (R=0, G=0, and B=0), are filtered out. Thereafter the total number of remaining pixels are captured by multiplying the number of rows in the candidate area by the number of columns in the candidate area. A percentage of color pixels and a percentage of black pixels are calculated. The color pixels are converted into, for example, a NumPy array. The color only pixel array is split into an R channel, a G channel, and a B channel and then a four-bin histogram of each R, G, B channel is calculated, which gives the percentage of pixels that fall into each bin. Thereafter, an output of the histogram results and percent of black pixels is constructed. The histogram output is then provided into a classification support vector machine (SVM) model built using, for example, the "rbf" kernel. The model can be built or constructed by any method known in the art and is not limited to the kernel described herein. If the SVM result is 0, the chosen horizon and subsequent candidate area contour analysis have not found an accurate candidate area and the chosen horizon is set to point slope form of (0,0,0). The image data may be updated to reflect that a horizon cannot be detected and the process for analyzing the image stops. Such check thereby corrects an erroneous horizon detection when, for example, the camera fails to move to the correct location. As illustrated in FIG. 5A, a visual rendering of two areas 208 and 210 is illustrated. Such areas may be depicted using a colored and/or patterned bounding box or other visual indicia to distinguish the two from each other.

If the SVM result is 1, the chosen horizon remains and image data may be updated to include a plurality of information, including, an indication of the horizon status, and the points of the candidate area contour given as percentage of (x, y) coordinate (e.g., to account for images of different sizes).

For example, if image 200 depicting scene 202 is a wellsite and the OOI is smoke, such smoke will likely appear above flaring equipment, e.g. in the "sky" or otherwise above the detected horizon. In such case, the candidate area of the OOI is above the chosen horizon 206, and the chosen horizon is a lower boundary of candidate area 212. FIG. 5A illustrates where the area 208 above the detected horizon is candidate area 212.

Following detection of a horizon of step 108, the process 100 proceeds to step 110 to at least one OOI in the candidate area is by a plurality of image processing techniques, wherein each of the plurality of image processing techniques is configured to yield resultant candidate OOI, such that an area of overlap of resultant candidate OOI from the plurality of image processing techniques corresponds to detection of the at least one OOI in the area of overlap.

Detecting the at least one OOI in the candidate area includes capturing one or more candidate OOI in the candidate area; applying filtering criteria to the captured one or more candidate OOI; and classifying any remaining filtered one or more candidate OOI to yield resultant candidate OOI.

The plurality of image processing techniques configured to yield resultant candidate OOI include: inputting color statistics of contours of the candidate area into a support vector machine (SVM) model to detect and classify candidate OOI using the SVM model and thereby yield resultant candidate OOI by a first image processing technique of the plurality of techniques; inputting color statistics of contours of the candidate area into an XGBoost model to detect and classify candidate OOI using the XGBoost model and thereby yield resultant candidate OOI by a second image processing technique; and inputting the obtained original (or RGB format) image into a convolutional neural network (CNN) to detect and classify candidate OOI using the CNN and thereby yield resultant candidate OOI by a third image processing technique.

For example, detecting the at least one OOI in the candidate area may include blurring the candidate area by a Gaussian blur convolution technique. The kernel size used for the Gaussian blur convolution technique may be any suitable size depending on the end-use application, including, without limitation a kernel size of 5×5. A canny edge-detection algorithm on the blurred candidate area is then executed and the pixel values are then inverted. Noise may be reduced, for example, by using an open morphological transformation on the inverted pixel value image, and then inverting the result. The technique proceeds to maximize the number of black pixels such that the images from the edge-detection algorithm can be subtracted from each other, the result of which leaves candidate OOI. Thereafter the system is configured to contour the differenced edge-detected image and obtain contour points for the candidate OOI. Such points may be scaled to be in coordinate of the original color image. The contours are then filtered. The filtering criteria is configurable depending upon the OOI to be detected. For example, when the OOI is smoke, the criteria may be configured to filter out contours having an area of less than 300 square pixels or other criteria, e.g. location within candidate area. Color statistics of the various masks and contours are calculated and obtained. For example, for color statistics of the candidate area excluding any contour representative of a candidate OOI, (for purposes of this example, the "sky"), the candidate area is masked, black pixels removed, and an average and standard deviation for red, green, and blue values in the color pixels is obtained. For each contour, a mask is created on the candidate area image, black pixels are removed from the mask, and for each mask the average and standard deviation for red, green, and blue values in the color pixels is obtained. Additionally, a Zscore of the contour colors is also obtained. For example, for each contour mask, subtract the "sky" average red value from the contour average red value. Divide this difference by the sky red standard deviation to yield the contour red z-score, and repeat for green and blue.

As discussed above, the color statistics of contours of the candidate area are provided to various models to classify candidate OOI and thereby yield resultant candidate OOI.

For example, the color statistics of contours in the candidate area are inputted into, for example, one or more models, such as a support vector machine (SVM) model and XGBoost model, and, for example, the obtained original (or RGB format) image may be inputted into a convolutional neural network (CNN). For example, the SVM model may be built using a 5th order polynomial kernel. For example, a result from the SVM and XGBoost models of 0 is indicative that the contour is "not the candidate OOI" and a result of 1 is indicative that the contour is the candidate OOI. The result from the CNN may be bounding boxes around the detected candidate OOI.

Figure 5B:
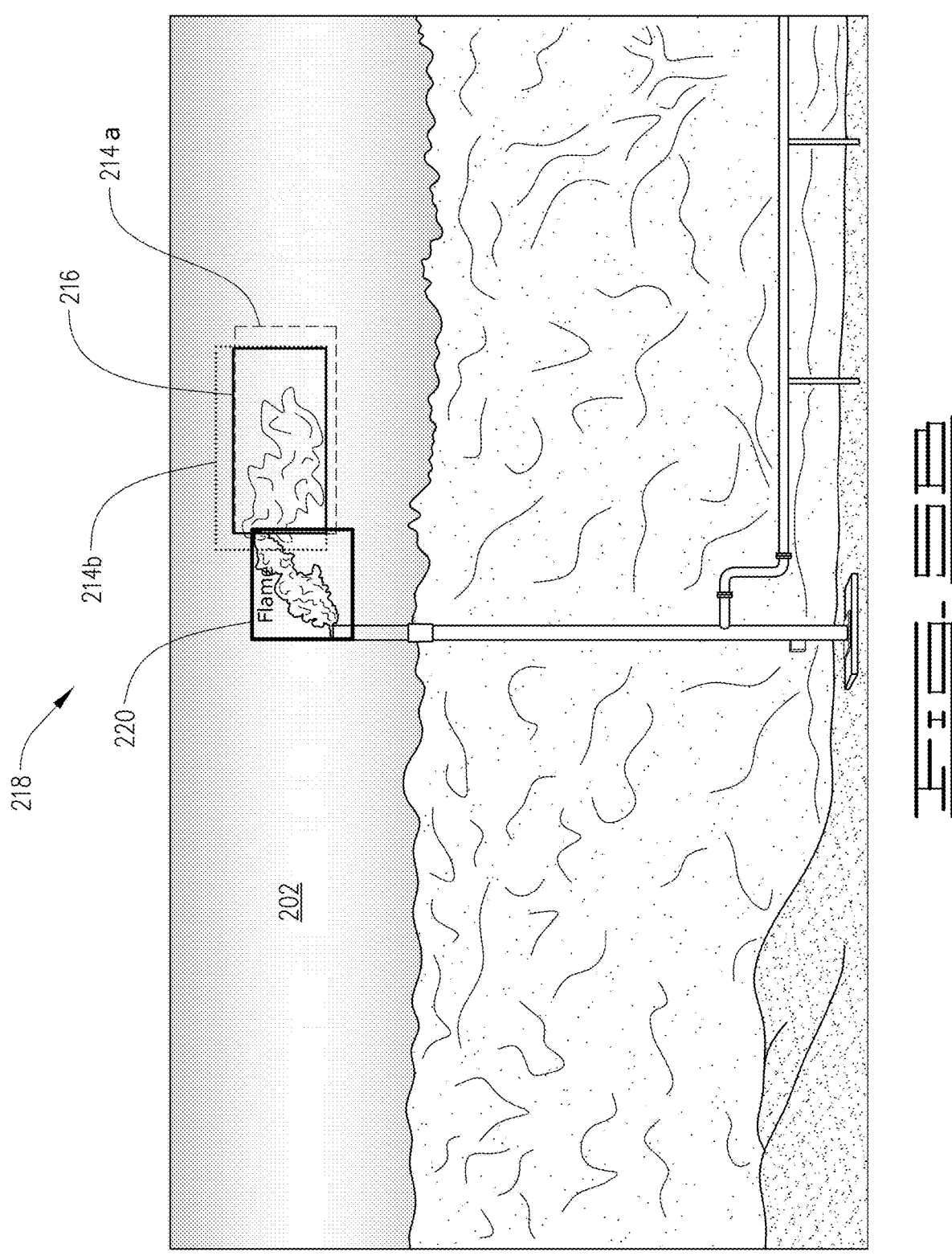
FIG. 5B illustrates an example of an annotated analyzed image by an intelligent image analytic system in accordance with the present disclosure.

For example, the bounding boxes of any of the techniques may visually distinguishable from each other, for example by different labels, colors, patterns, or other distinguishing features. For example, a bounding box may be labels as "possible candidate OOI-model" where model is an identifier of the model producing such result. Additionally, the system may be configured to update the associated image data with such information for each candidate OOI, including, without limitation its color statistics, classification results, positional coordinates, etc. The area of overlap of any of the plurality of image processing techniques configured to yield resultant candidate OOI is indicative of the at least one OOI in such area of intersection, as illustrated in FIG. 5B. For example, in FIG. 5B, bounding box 214a and 214b are indicative of the resultant candidate OOI of at least two of the plurality of image processing techniques. Bounding box 216, is the intersection of bounding boxes 214a and 214b and corresponds to the detected OOI. For example, if no OOI is detected, the associated image data may be updated to contain such information.

The intelligent image analytics system and its process 100 may be configured to proceed to step 106, to generate and render an annotated image of the scene, where the generated image includes an information graphic associated with the at least one detected OOI. For example, FIG. 5B, depicts annotated image 218 depicting scene 202. Exemplary annotated image 218 includes bounding boxes 214a, 214b, 216, and 220. Where each bounding box conveys information associated with the candidate OOI, detected OOI, and any other object, feature, or state, e.g. bounding box 220, included in scene 202. As described above, image 218 also includes image data associated therewith, and such image data may contain a plurality of information, including the horizon status, and other information described above in the present disclosure.

The described image analytics systems, methods, techniques, and computer program products are not limited to outdoor environments and may be employed in indoor and/or mixed environment (indoor and outdoor) settings.

For example, in the application for detecting and/or identifying smoke, other features and benefits of the disclosed image analytics systems, methods, techniques, and computer program products include: improved stewardship of the environment by reducing the amount of time equipment releases smoke into the atmosphere. Possible implementation in the forestry department/utilities for early fire detection, and therefore earlier suppression of forest fires, and consequences that may naturally flow therefrom, e.g. reduced carbon dioxide emissions and reduced insurance payout burden. Other benefits may include cost savings by the ability to utilize existing and/or lower cost equipment instead of specialized equipment, e.g. cameras. Such benefits flowing therefrom in the context of a wellsite operation may help an organization to achieve reliable and continuous operations and identify if equipment is smoking and needs maintenance. Additionally, other benefits may include the enablement of real-time image analytics and redundancies. For example, images may be collected in real-time from image input devices, e.g., cameras located on production facility wellsite. The images may be passed through at least one object detection model where the at least one model is configured to locate and detect certain features in the images. The analyzed image and any extracted data may be passed to and saved to a database for real-time and/or future use. The use of multiple techniques to analyze an image to detect certain features, use of predefined rules and logic to analyze the image provide redundancies in the analysis and thereby helps minimize false results, is more robust than existing systems, methods, techniques, and computer program products, and has the ability to handle variable conditions and environments, including changes in the use-environment.

Computing systems of any number or type are suitable for implementing the image analytics computing systems and performing the methods, techniques, processes, and executing the techniques, computer program products, instructions, and/or components described herein. Computing systems may include one or more computing devices of the same or different types, and each one or more computing devices may be operably connected to one or more input/output (I/O) devices. Computing device is representative of various forms of computing devices, including, without limitation, mainframes, desktops, laptops, workstations, servers, mobile or portable devices, such as personal digital assistants, tablets, smart-phones, cellular telephones, and other computing devices, and may be utilized to execute the various software components presented herein.

Computing device may include central processing unit (CPU). CPU includes one or more processors reading and/or executing instructions, programs, or applications stored therein, stored in memory, stored on computer readable storage media of the computing device or of I/O devices, or any combination of the foregoing. The one or more processors are also capable of accessing and/or storing data in memory, in processors, and/or computer readable storage media of the computing device or of I/O devices, or combinations of any of the foregoing. CPU is operably connected with memory. CPU is also operably connected with I/O devices through any applicable interface component for the corresponding I/O device, e.g. port (serial, parallel, USB), wire, card (sound, video, network), or the like. Exemplary, and non-limiting, types of CPUs may include general purpose processors, digital programmable devices, microcontrollers, digital signal processors (DSPs), application specific integrated circuit (ASIC), and field programmable gate array (FPGA), or other components and combinations thereof designed to perform the functions described herein. Memory includes data storage, volatile memory, e.g. random access memory (RAM), and non-volatile memory, e.g. read only memory (ROM) or non-volatile RAM (NVRAM), and other types of memory known in the art.

Computing systems and computing devices may operate in a networked environment using connections to remote computing devices and computing systems through a network, such as a local area network (LAN), wide area network (WAN), peer-to-peer networks, grid computing infrastructures, the Internet, and other network types known in the art. I/O devices include various devices that a user may use to interact with computing system or computing device. Non-limiting representative examples of I/O devices include keyboards, touchscreens, mouse and other pointing devices; a visual display device, such as a cathode ray tube, liquid crystal display, screens, touchscreens, and other suitable display devices for visually communicating and interacting with the user; audio devices, such as a microphone, headphones, speakers; and print devices for printing, scanning, faxing, and/or transmitting data and images. I/O devices may also include computer readable storage media, e.g. mass storage devices, disks, magnetic disks, optical disks, magnetic tape, flash memory, RAM, ROM, EEPROM, or any other media that can be used to carry or store computer-readable information. I/O devices may also include a communication device for connecting computing systems with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof Computing systems, including computing devices, may each include one or more communication devices and applicable controller(s) for connecting such computing systems or computing devices with one or more other computing systems and/or computing devices, such that I/O devices are integral with and are part of computing system or computing device and not a separate component therefrom, e.g. built-in cameras, microphones, speakers, network connection devices, and other built-in components.

Computing systems may include one or more I/O devices of the same type or of different types and combinations thereof and one or more computing devices of the same type or of different types and combinations thereof operably connected to each other.

The systems, functions, methods, techniques, or algorithms described herein may be implemented in hardware, software, firmware, middleware, or any combinations thereof. When implemented in software, the described methods, processes, techniques may be stored in memory, computer-readable storage media, and/or combinations thereof and transmitted as one or more instructions or code to cause one or more computing systems, including any applicable processor(s) to operate in accordance with the teachings of the present disclosure. The operable connection of the various components of computing system include buses, circuitry, wires, wireless, or other connections. The functions, methods, and techniques described herein may be implemented by one or more computing system in cooperation with each other. The components of computing system described, including their relationships and functions, are exemplary and are not to limit the implementation of the systems, methods, techniques, and computer program products described herein. For example, images may be captured and analyzed by one or more computing systems located at the same or at different locations. Such image capture and analysis may occur in real-time, on-demand, or at a scheduled time, or other time period or frequency.

To the extent various third-party software and components are referenced in the present disclosure, such is exemplary and for ease of discussion and readability. The present systems, methods, and computer program products are not limited to such components or software applications; and components and applications capable of performing similar functions to those described herein to achieve the results described herein are likewise suitable.

The use of ordinal number terminology (i.e., "first," "second," "third," "fourth," etc.) is for the purpose of differentiating between two or more items and is not meant to imply any sequence or order or importance to one item over another or any order of addition. The use of the phrase "or combinations thereof" as used herein refers to all permutations and combinations of the listed items preceding the term. The skilled artisan will understand that typically there is no limit on the number of items or terms in any combination, unless otherwise apparent from the context. The use of the term "or" in the claims is used to mean "and/or" unless explicitly indicated to refer to alternatives only or the alternatives are mutually exclusive, although the disclosure supports a definition that refers to only alternatives and "and/or."

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As previously discussed above, the present disclosure describing use of the systems, methods, and computer program products in a wellsite setting is for illustrative purposes only and should not be construed as limiting.

Although certain techniques, steps, or logic flows are described herein and/or illustrated in the figures as occurring sequentially, some techniques, steps, or logic flows may occur simultaneously with each other or in an order that is not depicted or described to achieve the described results. Other steps may be provided, or steps may be eliminated from the described techniques or flows, and other components may be added to, or removed from, the various examples of the image analytics systems, methods, and computer program products of the present disclosure.

While various implementations have been described herein, such descriptions are presented by way of example and are not to be limited to the precise descriptions and illustrations. Accordingly, numerous modifications and variations are possible by those skilled in the art without departing from the spirit and scope hereof, as defined by the following and later-submitted claims and their equivalents. The breadth and scope of the present disclosure should not be limited by any of the implementations and illustrations described herein, but should be defined only in accordance with the following and later-submitted claims and their equivalents.

What is claimed is:

1. A method of analyzing an image to detect at least one object of interest (OOI) therein, wherein the image depicts a scene, the method comprising:

detecting a horizon in the image, wherein the detected horizon defines a boundary of a candidate area;

detecting the at least one OOI in the candidate area by a plurality of image processing techniques, wherein each of the plurality of the image processing techniques is configured to yield resultant candidate OOI, such that an area of overlap of resultant candidate OOI from the plurality of image processing techniques corresponds to detection of the at least one OOI in the area of overlap;

wherein detecting the horizon in the image comprises analyzing the image via at least two image processing techniques to yield a detected candidate horizon per image processing technique, and selecting one of the detected candidate horizons, wherein the selected detected horizon corresponds to a best representation of the horizon in the image and the selection is based, in part, on a plurality of comparisons of each of the detected candidate horizons, wherein a first image processing technique for analyzing the image to detect a first detected candidate horizon is applied to a grayscale format of the image, and wherein a second image processing technique for analyzing the image to detect a second detected candidate horizon is applied to a red (R), green (G), blue (B), format of the image; and wherein the first image processing technique comprises:

cropping the grayscale format of the image to at least an upper 60% portion;

blurring the cropped grayscale format image by a Gaussian blur technique;

executing an edge-detection algorithm via a Sobel operation;

inverting pixel values of the executed Sobel operation edge-detection algorithm;

capturing a maximum pixel value of the inverted pixel values;

thresholding the inverted cropped image on at least 20% of the maximum pixel value;

capturing a white pixel percentage value of the thresholded image and creating contours around white pixels of the thresholded image;

calculating a width of each created contour;

locating one or more widest contours that meet predefined criteria to isolate, wherein the predefined criteria includes: a single contour having a width at least 40% of the image width, or two widest contours having a combined width of at least 40% of the image width;

isolating the one or more widest contours;

converting the one or more widest contours to points; and rendering a fitted line through the points on the RGB format of the image, wherein the fitted line is representative of a resultant detected horizon of the first image processing technique.

2. The method of claim 1, wherein the second image processing technique comprises:

cropping the RGB format of the image to at least an upper 60% portion;

blurring the cropped RGB format image by a Gaussian blur technique;

executing a Canny edge-detection algorithm on the blurred cropped RGB format image;

inverting pixel values of the executed Canny edge-detection algorithm;

reducing image noise using an open morphological transformation on the inverted pixel value image;

masking HUD from the reduced image;

blurring the masked HUD image by a Gaussian blur technique;

executing an edge-detection algorithm via a Sobel operation on the blurred masked HUD image;

inverting pixel values of the executed Sobel operation edge-detection algorithm;

capturing a maximum pixel value of the inverted pixel values;

thresholding the inverted cropped image on at least 20% of the maximum pixel value;

capturing a white pixel percentage value of the thresholded image and creating contours around white pixels of the thresholded image;

calculating a width of each created contour;

locating one or more widest contours that meet predefined criteria to isolate, wherein the predefined criteria includes: a single contour having a width at least 40% of the image width, or two widest contours having a combined width of at least 40% of the image width;

isolating the one or more widest contours;

converting the one or more widest contours to points; and rendering a fitted line through the points on the RGB format of the image, wherein the fitted line is representative of the resultant detected horizon of the second image processing technique.

3. The method of claim 2, wherein the plurality of comparisons for selecting the candidate horizon includes:

assessing of a percentage value of white pixels and a number of contours in a Sobel threshold for each of the at least two image processing techniques;

determining a validity of the detected candidate horizon for each of the at least two image processing techniques;

comparing similarities of the detected candidate horizon for each of the at least two image processing techniques;

comparing grayscale pixel intensity standard deviations above and below each of the candidate horizons.

4. The method of claim 1, wherein the at least two image processing techniques are performed simultaneously with each other or sequentially to each other.

5. The method of claim 1, wherein the step of detecting the at least one OOI in the candidate area includes:

capturing one or more candidate OOI in the candidate area;

applying filtering criteria to the captured one or more candidate OOI; and classifying any filtered one or more candidate OOI to yield resultant candidate OOI.

6. The method of claim 1, wherein the at least two image processing techniques configured to yield resultant candidate OOI include:

inputting color statistics of contours of the candidate area into a support vector machine (SVM) model to detect and classify candidate OOI using the SVM model and thereby yield resultant candidate OOI by a first image processing technique;

inputting color statistics of contours of the candidate area into an XGBoost model to detect and classify candidate OOI using the XGBoost model and thereby yield resultant candidate OOI by a second image processing technique; and inputting the image into a convolutional neural network (CNN) to detect and classify candidate OOI using the CNN and thereby yield resultant candidate OOI by a third image processing technique.

7. The method of claim 1, further comprising:

generating an annotated image of the scene, wherein the generated image includes an information graphic associated with the at least one detected OOI.

8. The method of claim 1, wherein the at least one OOI is smoke.

9. The method of claim 1, wherein the detected candidate horizon is a lower boundary of the candidate area.

10. A computing system configured to analyze an image to detect at least one object of interest (OOI) therein, wherein the image depicts a scene, the computing system comprising:

at least one processor;

at least one non-transitory computer readable storage media operably coupled to the at least one processor; and program instructions stored on the at least one non-transitory computer readable storage media for execution by the at least one processor that, when executed by the at least one processor, cause the at least one processor to perform operations comprising:

detecting a horizon in the image, wherein the detected horizon defines a boundary of a candidate area; and detecting at least one OOI in the candidate area by a plurality of image processing techniques, wherein each of the plurality of image processing techniques is configured to yield resultant candidate OOI, such that an area of overlap of resultant candidate OOI from the plurality of image processing techniques corresponds to detection of the at least one OOI in the area of overlap, wherein detecting the horizon in the image comprises analyzing the image via at least two image processing techniques to yield a detected candidate horizon per image processing technique, and selecting from one of the detected candidate horizons, wherein the selected detected horizon corresponds to a best representation of the horizon in the image and the selection is based, in part, on a plurality of comparisons of each of the detected candidate horizons, wherein a first image processing technique for analyzing the image to detect a first detected candidate horizon is applied to a grayscale format of the image, and wherein a second image processing technique for analyzing the image to detect a second detected candidate horizon is applied to a red (R), green (G), blue (B) format of the image, wherein the first image processing technique comprises:

cropping the grayscale format of the image to at least an upper 60% portion;

blurring the cropped grayscale format image by a Gaussian blur technique;

executing an edge-detection algorithm via a Sobel operation;

inverting pixel values of the executed Sobel operation edge-detection algorithm;

capturing a maximum pixel value of the inverted pixel values;

thresholding the inverted cropped image on at least 20% of the maximum pixel value;

capturing a white pixel percentage value of the thresholded image and creating contours around white pixels of the thresholded image;

calculating a width of each created contour;

locating one or more widest contours that meet predefined criteria to isolate, wherein the predefined criteria includes: a single contour having a width at least 40% of the image width, or two widest contours having a combined width of at least 40% of the image width;

isolating the one or more widest contours;

converting the one or more widest contours to points; and rendering a fitted line through the points on the RGB format of the image, wherein the fitted line is representative of a resultant detected horizon of the first image processing technique.

11. The computing system of claim 10, wherein the second image processing technique comprises:

cropping the RGB format of the image to at least an upper 60% portion;

blurring the cropped RGB format image by a Gaussian blur technique;

executing a Canny edge-detection algorithm on the blurred cropped RGB format image;

inverting pixel values of the executed Canny edge-detection algorithm;

reducing image noise using an open morphological transformation on the inverted pixel value image;

masking HUD from the reduced image;

blurring the masked HUD image by a Gaussian blur technique;

executing an edge-detection algorithm via a Sobel operation on the blurred masked HUD image;

inverting pixel values of the executed Sobel operation edge-detection algorithm;

capturing a maximum pixel value of the inverted pixel values;

thresholding the inverted cropped image on at least 20% of the maximum pixel value;

capturing a white pixel percentage value of the thresholded image and creating contours around white pixels of the thresholded image;

calculating a width of each created contour;

locating one or more widest contours that meet predefined criteria to isolate, wherein the predefined criteria includes: a single contour having a width at least 40% of the image width, or two widest contours having a combined width of at least 40% of the image width;

isolating the one or more widest contours;

converting the one or more widest contours to points; and rendering a fitted line through the points on the RGB format of the image, wherein the fitted line is representative of the resultant detected horizon of the second image processing technique.

12. The computing system of claim 11, wherein the plurality of comparisons for selecting the candidate horizon includes:

assessing of a percentage value of white pixels and a number of contours in a Sobel threshold for each of the at least two image processing techniques;

determining a validity of the detected candidate horizon for each of the at least two image processing techniques;

comparing similarities of the detected candidate horizon for each of the at least two image processing techniques; and comparing grayscale pixel intensity standard deviations above and below each of the candidate horizons.

13. The computing system of claim 10, wherein the at least two image processing techniques are performed simultaneously with each other or sequentially to each other.

14. The computing system of claim 10, wherein the operation of detecting the at least one OOI in the candidate area includes:

capturing one or more candidate OOI in the candidate area;

applying filtering criteria to the captured one or more candidate OOI; and classifying any filtered one or more candidate OOI to yield resultant candidate OOI.

15. The computing system of claim 10, wherein the at least two image processing techniques configured to yield resultant candidate OOI include:

inputting color statistics of contours of the candidate area into a support vector machine (SVM) model to detect and classify candidate OOI using the SVM model and thereby yield resultant candidate OOI by a first image processing technique;

inputting color statistics of contours of the candidate area into an XGBoost model to detect and classify candidate OOI using the XGBoost model and thereby yield resultant candidate OOI by a second image processing technique; and inputting the image into a convolutional neural network (CNN) to detect and classify candidate OOI using the CNN and thereby yield resultant candidate OOI by a third image processing technique.

16. The computing system of claim 10, wherein the operations further comprise generating an annotated image of the scene, wherein the generated image includes an information graphic associated with the at least one detected OOI.

17. The computing system of claim 10, wherein the at least one OOI is smoke.

18. The computing system of claim 10, wherein the detected candidate horizon is a lower boundary of the candidate area.

19. A computer program product including one or more non-transitory computer readable storage mediums having instructions encoded thereon that when executed by at least one processor, cause a process to be carried out for analyzing an image to detect at least one object of interest (OOI) therein, wherein the image depicts a scene, the process comprising:

detecting a horizon in the image, wherein the detected horizon defines a boundary of a candidate area; and detecting the at least one OOI in the candidate area by a plurality of image processing techniques, wherein each of the plurality of image processing techniques is configured to yield resultant candidate OOI, such that an area of overlap of resultant candidate OOI from the plurality of image processing techniques corresponds to detection of the at least one OOI in the area of overlap, wherein detecting a horizon in the image comprises analyzing the image via at least two image processing techniques to yield a detected candidate horizon per image processing technique, and selecting one of the detected candidate horizons, wherein the selected detected horizon corresponds to a best representation of the horizon in the image and the selection is based, in part, on a plurality of comparisons of each of the detected candidate horizons, wherein a first image processing technique for analyzing the image to detect a first detected candidate horizon is applied to a grayscale format of the image, and wherein a second image processing technique for analyzing the image to detect a second detected candidate horizon is applied to a red (R) green (G), blue (B) format of the image, and wherein the first image processing technique comprises:

cropping the grayscale format of the image to at least an upper 60% portion;

blurring the cropped grayscale format image by a Gaussian blur technique;

executing an edge-detection algorithm via a Sobel operation;

inverting pixel values of the executed Sobel operation edge-detection algorithm;

capturing a maximum pixel value of the inverted pixel values;

thresholding the inverted cropped image on at least 20% of the maximum pixel value;

capturing a white pixel percentage value of the thresholded image and creating contours around white pixels of the thresholded image;

calculating a width of each created contour;

locating one or more widest contours that meet predefined criteria to isolate, wherein the predefined criteria includes: a single contour having a width at least 40% of the image width, or two widest contours having a combined width of at least 40% of the image width;

isolating the one or more widest contours;

converting the one or more widest contours to points; and rendering a fitted line through the points on the RGB format of the image, wherein the fitted line is representative of a resultant detected horizon of the first image processing technique.

20. The computer program product of claim 19, wherein the second image processing technique comprises:

cropping the RGB format of the image to at least an upper 60% portion;

blurring the cropped RGB format image by a Gaussian blur technique;

executing a Canny edge-detection algorithm on the blurred cropped RGB format image;

inverting pixel values of the executed Canny edge-detection algorithm;

reducing image noise using an open morphological transformation on the inverted pixel value image;

masking HUD from the reduced image;

blurring the masked HUD image by a Gaussian blur technique;

executing an edge-detection algorithm via a Sobel operation on the blurred masked HUD image;

inverting pixel values of the executed Sobel operation edge-detection algorithm;

capturing a maximum pixel value of the inverted pixel values;

thresholding the inverted cropped image on at least 20% of the maximum pixel value;

capturing a white pixel percentage value of the thresholded image and creating contours around white pixels of the thresholded image;

calculating a width of each created contour;

locating one or more widest contours that meet predefined criteria to isolate, wherein the predefined criteria includes: a single contour having a width at least 40% of the image width, or two widest contours having a combined width of at least 40% of the image width;

isolating the one or more widest contours;

converting the one or more widest contours to points; and rendering a fitted line through the points on the RGB format of the image, wherein the fitted line is representative of the resultant detected horizon of the second image processing technique.

21. The computer program product of claim 20, wherein the plurality of comparisons for selecting the candidate horizon includes:

assessing of a percentage value of white pixels and a number of contours in a Sobel threshold for each of the at least two image processing techniques;

determining a validity of the detected candidate horizon for each of the at least two image processing techniques;

comparing similarities of the detected candidate horizon for each of the at least two image processing techniques;

comparing grayscale pixel intensity standard deviations above and below each of the candidate horizons.

22. The computer program product of claim 19, wherein the at least two image processing techniques are performed simultaneously with each other or sequentially to each other.

23. The computer program product of claim 19, wherein detecting the at least one OOI in the candidate area includes:

capturing one or more candidate OOI in the candidate area;

applying filtering criteria to the captured one or more candidate OOI; and classifying any filtered one or more candidate OOI to yield resultant candidate OOI.

24. The computer program product of claim 19, wherein the at least two image processing techniques configured to yield resultant candidate OOI include:

inputting color statistics of contours of the candidate area into a support vector machine (SVM) model to detect and classify candidate OOI using the SVM model and thereby yield resultant candidate OOI by a first image processing technique;

inputting color statistics of contours of the candidate area into an XGBoost model to detect and classify candidate OOI using the XGBoost model and thereby yield resultant candidate OOI by a second image processing technique; and inputting the image into a convolutional neural network (CNN) to detect and classify candidate OOI using the CNN and thereby yield resultant candidate OOI by a third image processing technique.

25. The computer program product of claim 19, wherein the process further comprises generating an annotated image of the scene, wherein the generated image includes an information graphic associated with the at least one detected OOI.

26. The computer program product of claim 19, wherein the at least one OOI is smoke.

27. The computer program product of claim 19, wherein the detected candidate horizon is a lower boundary of the candidate area.

\* \* \* \* \*